US009462195B2

(12) United States Patent
Krug

(10) Patent No.: US 9,462,195 B2
(45) Date of Patent: Oct. 4, 2016

(54) SYSTEM AND METHOD FOR DISTRIBUTED VIDEO AND OR AUDIO PRODUCTION

(71) Applicant: Scalable Video Systems GMBH, Weiterstadt (DJ)

(72) Inventor: Alfred Krug, Kirchzell (DE)

(73) Assignee: SCALABLE VIDEO SYSTEMS GMBH, Weiterstadt (DE)

( * ) Notice: Subject to any disclaimer, the term of this patent is extended or adjusted under 35 U.S.C. 154(b) by 0 days.

(21) Appl. No.: 14/413,289

(22) PCT Filed: Jul. 1, 2013

(86) PCT No.: PCT/EP2013/063870
§ 371 (c)(1),
(2) Date: Jan. 7, 2015

(87) PCT Pub. No.: WO2014/009197
PCT Pub. Date: Jan. 16, 2014

(65) Prior Publication Data
US 2015/0172559 A1    Jun. 18, 2015

(30) Foreign Application Priority Data

Jul. 7, 2012  (EP) .................................... 12175474

(51) Int. Cl.
| H04N 9/475 | (2006.01) |
| H04N 5/265 | (2006.01) |
| H04N 5/262 | (2006.01) |
| H04N 5/268 | (2006.01) |

(52) U.S. Cl.
CPC .............. H04N 5/265 (2013.01); H04N 5/262 (2013.01); H04N 5/268 (2013.01)

(58) Field of Classification Search
CPC ...................... H04N 21/4307; H04N 21/2368; H04N 5/04; H04N 9/475; H04L 47/28; H04L 47/2416
USPC ................................................ 348/660, 518
See application file for complete search history.

(56) References Cited

U.S. PATENT DOCUMENTS 5,995,679 A * 11/1999 Riegel ................... H04N 5/272
348/E5.058
6,055,578 A *  4/2000 Williams .............. H04L 12/413
709/253
(Continued)

FOREIGN PATENT DOCUMENTS

DE         10336214 A1    3/2004
EP          1217547 A2    6/2002
(Continued)

OTHER PUBLICATIONS

Machine Translations of Abstract, Claims, and Description of JP2002149316.
R. Boutaba, N. Ren, et al., "Distributed Video Production: Tasks, Architecture and QoS Provisioning", Multimedia Tools and Applications, 2002.
M. Kaul, M. Wasserschaff, S. Gibbs, C. Breiteneder, and D. Steinberg, "Studio on Demand by Distributed Video Production over ATM", International Broadcasting Convention, 1996.
Hideki Sumiyoshi, Yuichi Mochizuki et al., "Network-based Cooperative TV Program Production System", IEEE Transactions on Broadcasting, 42, 1996.
Martin Nicholson, "Feasibility of building an all-IP network—the BBC NGN project", Internet Protocol, 2012.
Machine Translation of Abstract, Claims and Description of DE10336214.

*Primary Examiner* — Michael Lee
(74) *Attorney, Agent, or Firm* — Meagher Emanuel Laks Goldberg & Liao, LLP

(57) ABSTRACT

A system for processing video and/or audio signals is suggested. The system comprises a control unit and a processing unit. The control unit and the processing unit are communicatively connected for exchanging digital data in a packetized format. The proposed system allows splitting the processing ability of a big vision mixer into smaller sub units without losing real-time processing behavior. In addition to that a method of processing video and/or audio signals is suggested. The method utilizes a control unit and a plurality of processing units, which are communicatively connected for exchanging digital data in a packetized format. The method comprises the steps of receiving video signals at the processing units; sending video signals from the processing units; sending command signals from the control unit to one or several processing units; and scheduling the execution of command signals received in the processing units to compensate for signal latencies and processing latencies.

7 Claims, 6 Drawing Sheets

(56) References Cited

U.S. PATENT DOCUMENTS

| | | | |
|---|---|---|---|
| 6,501,441 B1* | 12/2002 | Ludtke | G06F 3/1446 345/1.1 |
| 8,301,790 B2* | 10/2012 | Morrison | G10H 1/0058 709/203 |
| 8,537,838 B2 | 9/2013 | Patel et al. | |
| 8,743,292 B2 | 6/2014 | Atherton et al. | |
| 2004/0150751 A1 | 8/2004 | Phillips et al. | |
| 2005/0177855 A1* | 8/2005 | Maynard | H04L 12/2801 725/88 |
| 2005/0273790 A1* | 12/2005 | Kearney, III | H04L 12/66 719/328 |
| 2006/0230427 A1* | 10/2006 | Kunkel | H04N 5/44543 725/133 |
| 2007/0169115 A1* | 7/2007 | Ko | H04L 12/2803 717/174 |
| 2009/0164876 A1* | 6/2009 | Logan | H04L 65/4015 715/201 |
| 2009/0238263 A1 | 9/2009 | Jaggi et al. | |
| 2010/0118164 A1 | 5/2010 | Fujita et al. | |
| 2010/0149985 A1 | 6/2010 | Rousseau et al. | |
| 2012/0195313 A1* | 8/2012 | White | H04L 43/0858 370/390 |
| 2012/0206557 A1* | 8/2012 | Ridges | H04N 21/41407 348/14.02 |
| 2012/0209933 A1* | 8/2012 | Ridges | H04L 65/403 709/208 |
| 2012/0260296 A1* | 10/2012 | Mallet | H04N 21/6143 725/62 |

FOREIGN PATENT DOCUMENTS

| | | |
|---|---|---|
| EP | 1936908 A1 | 6/2008 |
| EP | 2077647 A1 | 7/2009 |
| EP | 2107708 A1 | 10/2009 |
| EP | 2683155 A1 | 1/2014 |
| JP | 2002149316 A | 5/2002 |
| WO | 2005122025 A2 | 12/2005 |
| WO | 2009014716 A1 | 1/2009 |

* cited by examiner

SYSTEM AND METHOD FOR DISTRIBUTED VIDEO AND OR AUDIO PRODUCTION

FIELD

The invention is related to a system and method for processing video and/or audio signals.

BACKGROUND

Live video productions such as TV productions are realized today using vision mixers. Vision mixers are commercially available e.g. from the companies Grass Valley, Sony, Snell & Wilcox, and Ross.

A vision mixer (also called video switcher, video mixer, production switcher or simply mixer) is a device used to select between different video input signals to generate a video output signal. Besides switching directly between two input signals the vision mixer can also generate different kinds of transitions. Direct switching means that frame N is from a first input signal and frame N+1 is from a second input signal. Transitions between two input signals include simple dissolves and various kinds of effect transitions. Most mixers are equipped with keyers and matte generators to perform keying operations and to generate background signals which are also called mattes.

The vision mixer also performs the routing and switching of audio signals accompanying the video signals. However, since the processing of video signals is more complex than the processing of audio signals the present patent application is focused on the video signal. It is to be understood that in the context of the present patent application the processing of the video signal also implies a corresponding processing of an accompanying audio signal. Only for the sake of better intelligibility of the description of the present invention audio signals are not always mentioned in addition to the video signals.

In order to enable the multiple functionalities of vision mixers they consist of a huge amount of hardware components to process the video signals. The processing hardware components are located in one housing and are connected with local bus solutions in order to control all video processing hardware in real-time to meet the fast control requirements of live productions. In today's vision mixers there is a latency of approximately 40 ms between the moment when a user pushes a button until the associated function is executed. A latency of 40 ms is still called "real-time" processing.

The vision mixer comprises a central mixing electronic, several input channels and at least one output channel, a control unit and a user interface. Such kind of vision mixer is described for example in DE 103 36 214 A1.

The mixing electronic is provided with up to 100 or even more video input signals at the same time. The input signals are live video signals from cameras, recorded video clips from a server such as archived material, slow-motion clips from dedicated slow-motion servers, synthetic images, animations and alphanumeric symbols from graphic generators.

Devices external to the vision mixer are also controlled from the vision mixer by the user. However, the integration of the external devices to the live control environment in the same manner as the vision mixer internal hardware can only be achieved with certain restrictions. The restrictions are caused by more or less random signal latencies involved in the video, audio and control interconnections. The reason is that the overall processing including external devices does not behave in the same way as if the hardware components are connected to the same local control-, video- and audio-bus. Specifically, the overall control latency is predetermined only within a certain time window as well as the overall signal latency and signal change latency. The time windows range from several frames up to seconds and do not meet the requirements for real-time control behavior. Since the individual delays can be additionally random, there is a certain risk that a set of changes involving the vision mixer and external devices are not executed in a synchronized manner and produce temporary inconsistent video and/or audio frames. This general problem of synchronizing several processing devices is solved today by mechanisms that work in two steps:

At first, external devices which shall provide a certain signal are prepared at least some seconds ahead of the actual use of the signal. Secondly, the vision mixer waits for the ready status signal of the external device or alternatively for a predetermined safe time period before the signal of the external device is added to the live stream, i.e. to the production stream of the vision mixer. The predetermined safe time period is long enough to be sure that the external device is ready to execute a command.

The described approach of the state of the art vision mixers requires that the operator of the vision mixer must have in mind that some hardware devices need to be prepared with the additional complication that among those hardware devices requiring preparation each one has to be prepared in its dedicated manner. An inherent disadvantage of this approach is that the prepared hardware devices are locked during the waiting time and are not available for processing tasks. Consequently, today's vision mixers for live productions typically contain much more hardware than needed for a specific live production in terms of video inputs, video outputs and processing stages because the director of a live video production usually wants to execute as many as possible functionalities of the production preferably within one processing frame to achieve all intended to signal changes simultaneously and in real time.

Boutaba R et al: "Distributed Video Production: Tasks, Architecture and QoS Provisioning", published in Multimedia Tools and Applications, Kluwer Academic Publishers, Boston, US, Volume 16, Number 1-2, 1 Jan. 2002, pages 99 to 136. Boutaba et al address the issue of delay, delay variations and inter-media skew requirements. Boutaba et al explicitly state that delay performance is measured based on delay variation or "jitter". Jitter is a measure of the difference in delay experienced by different packets in the network due to variation in buffer occupancy in intermediate switching nodes. Another form of jitter is inter-stream jitter or "skew", which measures the difference in delay as seen by separate streams pertaining to the same application (such as audio and video). In order to ensure proper intra-stream synchronization, low delay variation is often required. Boutaba et al suggest compensating jitter by buffering the data streams. This requires the provision of sufficient memory capable of storing sufficiently long intervals of the video and audio data to compensate the jitter. In the case of high definition video data this requires a big storage capacity.

Taking this as a starting point it is an object of the present invention to propose an alternative approach for making live video productions.

SUMMARY OF THE INVENTION

According to a first aspect the present invention suggests a system for processing video and/or audio signals, wherein the system comprises a control unit and at least one processing unit, wherein the control unit and the processing unit(s) are communicatively connected by data links for exchanging digital data in a packetized format. The packetized data represent video signals and/or command signals communicated between the control unit and the processing unit. Each processing unit comprises means for compensating signal latencies caused by communication of signals between the control unit and one processing unit and/or between two processing units and for compensating latencies caused by the processing of signals in the processing unit(s). The data links are adapted to provide for latencies which are targeted to be constant and that the means for compensating signal latencies are adapted for delaying command signals.

In an advantageous embodiment the at least one processing unit or the plurality of processing units comprise(s) one or several graphical processing units.

In a further advantageous embodiment the inventive system is adapted for determining latencies of signals transmitted through the data links.

Finally, it has been found useful when the means for compensating signal latencies comprise adaptable delays.

According to a useful embodiment of the present invention the one processing unit executing the last processing step of the video and/or audio signals is adapted for executing this last processing step only after this one processing unit has received all necessary input signals from other processing units of the system.

In one specific embodiment of the present invention the control unit comprises a processing unit. The processing unit can be adapted for preparing a multi-view signal enabling the display of the production signal and the various source signals.

The invention allows splitting the processing capability of a big vision mixer into smaller sub units and distributing the processing resources to different locations without losing the real-time processing behavior as it is known from single unit vision mixers. In other words, the invention suggests replacing a big single vision mixer by the multi-site system.

According to a second aspect the present invention suggests a method of processing video and/or audio signals utilizing a control unit and a plurality of processing units, which are communicatively connected by data links for exchanging digital data in a packetized format, wherein the data links (410) are adapted to provide for latencies which are targeted to be constant, and wherein the method comprises the following steps:

receiving video signals at the processing units;

sending video signals from the processing units;

sending command signals from the control unit to one or several processing units;

scheduling the execution of command signals received in the processing units to compensate for signal latencies caused by the communication of signals between the control unit and one processing unit and/or between two processing units and for compensating latencies caused by the processing of signals in the processing unit(s).

Advantageously the step of scheduling the execution of command signals involves the step of introducing a delay to compensate for signal latencies caused by the communication of signals between the control unit and one processing unit and/or between two processing units.

As an alternative embodiment the invention suggests a method of processing video and/or audio signals utilizing a control unit and a plurality of processing units, which are communicatively connected by data links for exchanging digital data in a packetized format, wherein the data links (410) are adapted to provide for latencies which are targeted to be constant, and wherein the method comprises the following steps:

receiving video signals at the processing units;

sending video signals from the processing units;

sending command signals from the control unit to one or several processing units;

executing command signals in the processing units without delay but only after each processing unit has received all necessary input signals for performing the processing.

The invention will be better understood by reading the detailed description with the appended drawings.

BRIEF DESCRIPTION OF THE DRAWINGS

In the drawing an embodiment of the present invention is illustrated. Features which are the same in the figures are labeled with the same or a similar reference numbers. It shows.

DETAILED DESCRIPTION OF AN EMBODIMENT OF THE PRESENT INVENTION

Figure 1:
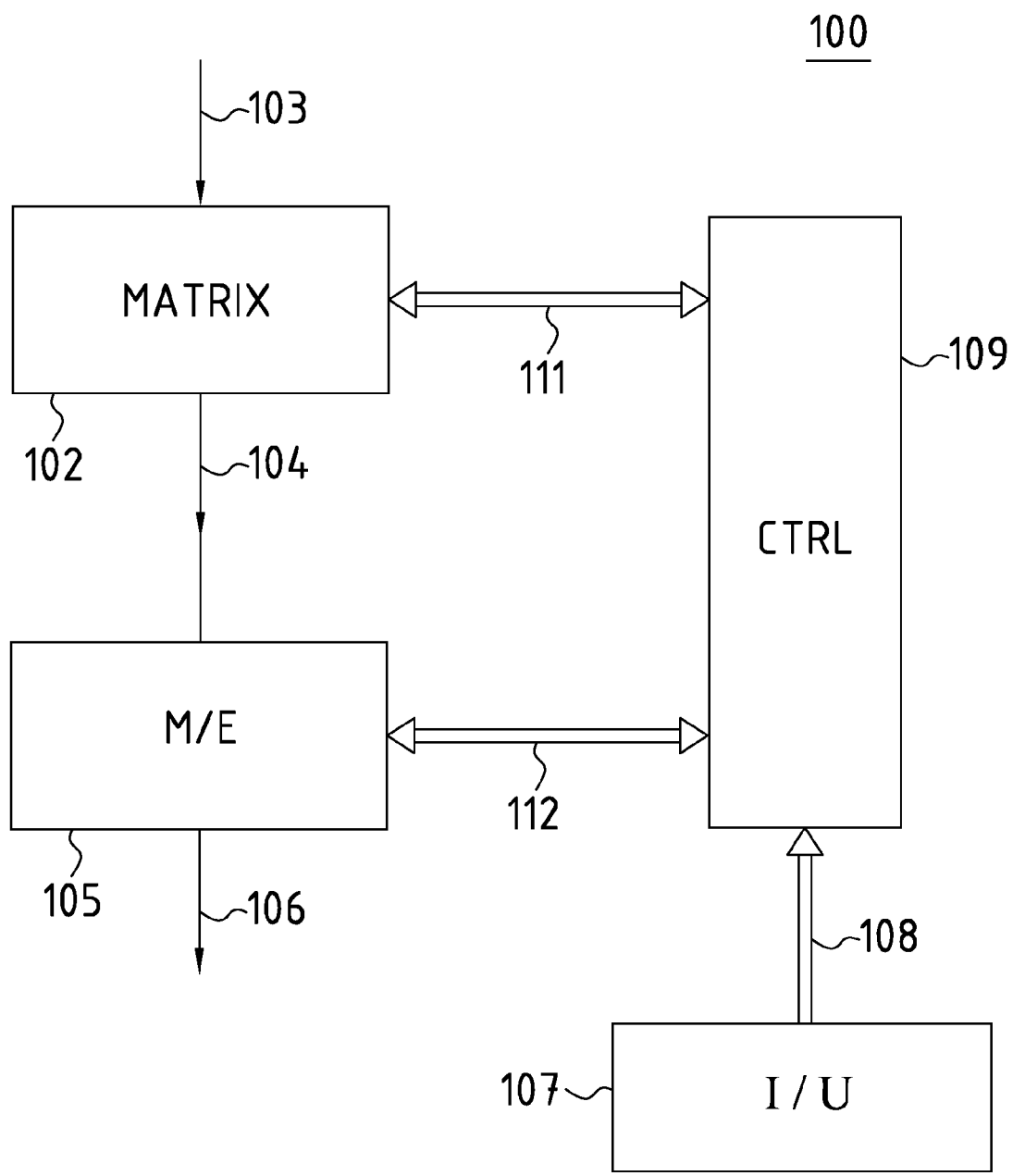
FIG. 1 a schematic block diagram of a conventional vision mixer.

FIG. 1 shows a schematic block diagram of a conventional vision mixer 100 which is also briefly called mixer. The mixer 100 comprises a cross point matrix or matrix 102 having a plurality of video inputs and a plurality of video outputs symbolized by arrows 103 and 104, respectively. Professional vision mixers are using serial digital interface (SDI) digital data for receiving or sending video data. The SDI digital data also comprise embedded audio streams, ancillary data, clock data and meta data. In a 1.5 Gbit/s data stream there are 16 embedded audio channels and in a 3.0 Gbit/s data stream there are 32 embedded audio streams. The mixer 100 can send and receive digital data also in other formats such as high definition serial interface data (HD-SDI) and digital component video. The matrix 102 is adapted for connecting any one of the video inputs with any one of the video outputs in response to a user command. The output channels of the matrix 102 are provided to a mixer and video effect stage (M/E stage) 105 which is also called a mixer level. The video output signal processed by the M/E stage 105 is indicated with an arrow 106. The functionalities of mixer 100 are controlled by means of an input unit 107 into which the user can enter control commands to control and execute the processing of the video input signals and to create and to produce a desired video output signal. The input unit 107 transfers the control commands via the data and control bus 108 to a control unit 109. The control unit 109 interprets the user input commands and addresses corresponding command signals to the matrix 102 and the M/E stage 105. For this purpose the control unit 109 is connected with the matrix 102 and the M/E stage 105 with data and control buses 111 and 112, respectively. The buses 108, 111, and 112 are bidirectional buses allowing return messages to the control unit 109 and the input unit 107. The return messages provide feedback of the operating status of matrix 102 and the M/E stage 105. The input unit 107 displays status indicators reflecting the operating status of the mixer 100 for the information of the user.

Figure 2A:
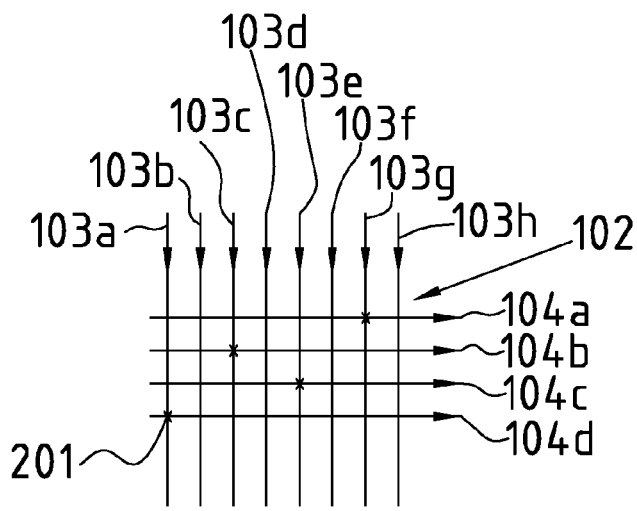
FIGS. 2A and 2B a schematic illustration of the vision mixer shown in FIG. 1.
Figure 2B:
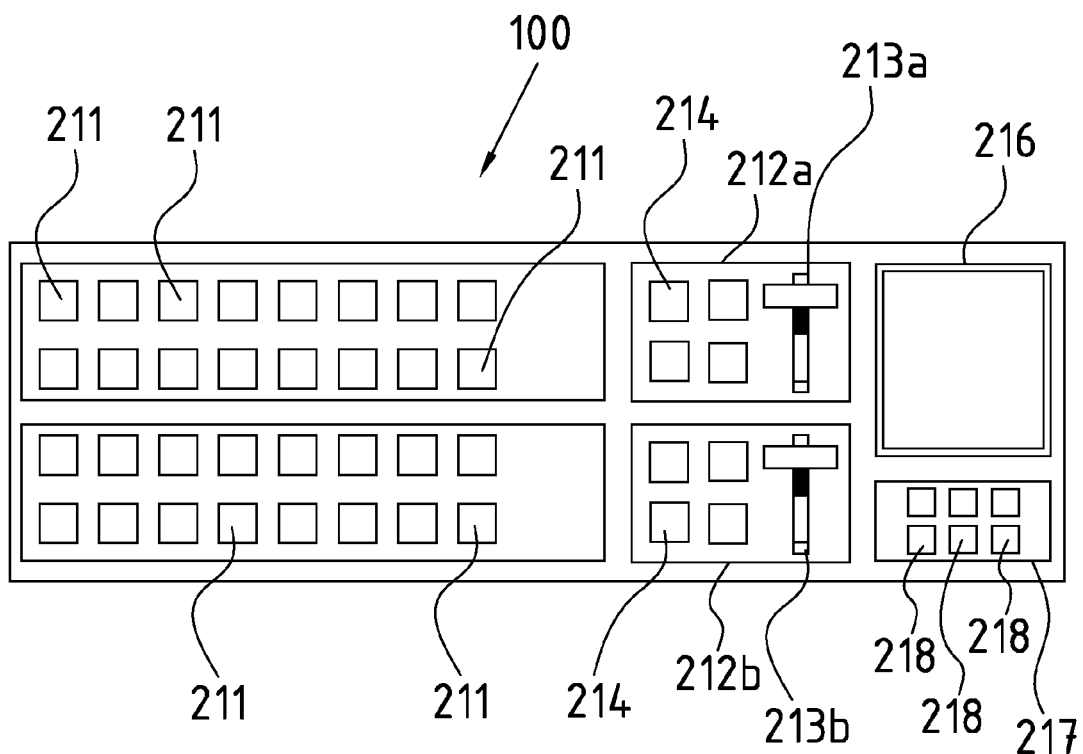

FIGS. 2A and 2B show the mixer 100 of FIG. 1 in greater detail.

FIG. 2A shows that the matrix 102 has eight video input channels 103a-103h and four video output channels 104a-104d. The matrix 102 allows the user to selectively switch any of the video input channels 103a-103h to any one of the video output channels 104a-104d. In the situation shown in FIG. 2A video input channel 103a is connected with video output channel 104d. The connection is symbolized in FIG. 2A with a small cross at the connection point 201. Similarly, video input channel 103c is connected with video output channel 104b, video input channel 103e with video output channel 104c and video input channel 103h with video output channel 104a. Frequently, not all video input channels are connected with a video output channel. In the usual nomenclature the matrix 102 shown in FIG. 2A is denominated as an 8×4 matrix. A vision mixer in a modern production environment can incorporate a 256×256 matrix making the operation of the modern vision mixer a complicated and demanding task which will be explained in further detail in connection with FIG. 2B. The matrix 102 is a dedicated SDI matrix and therefore an expensive device.

FIG. 2B shows the physical user interface of mixer 100 of FIG. 1. The switching of one of the video input channels 103a-103h to one of the four video output channels 104a-104d is executed by operating a pushbutton 211 by the user. As shown in FIG. 2B there are 32 push buttons 211 available which are arranged in four lines and eight columns. Each line of pushbuttons 211 is attributed to a specific video output channel while each column of pushbuttons 211 is attributed to one of the eight video input channels. The four video output channels form two pairs of video output channels. Each pair of video output channels is provided to an M/E stage 212a and 212b, respectively. The M/E stages 212a and 212b are operated by effect levers 213a and 213b and selection buttons 214. In practice the output signal of the first M/E stage 212a is sometimes utilized as a new input signal for the second M/E stage 212b, or vice versa. In a parameter input array 216 the user can enter parameters which determine the video effects to be executed. Such video effects are different kinds of effect transitions like a horizontal or vertical transition, the rotation of a new image and the determination how sharp the transition between two different video streams is. Finally, there is a so-called downstream keyer 217 which is used to key-in text messages into the final video image. It is noted that the vision mixer in FIG. 2B is very much simplified. Modern vision mixers are provided with many more video input and output channels as it has been mentioned above and comprise up to eight downstream keyers. In consequence such a modern vision mixer is provided with more than 1000 pushbuttons. Obviously, a modern vision mixer is a complicated and expensive hardware device which is difficult to operate. The complexity of conventional vision mixers requires well trained users. Ironically, sometimes the users are not sufficiently trained to save training costs. But in consequence many functions of the expensive equipment remain unused because the users are not aware of all functions.

Figure 3A:
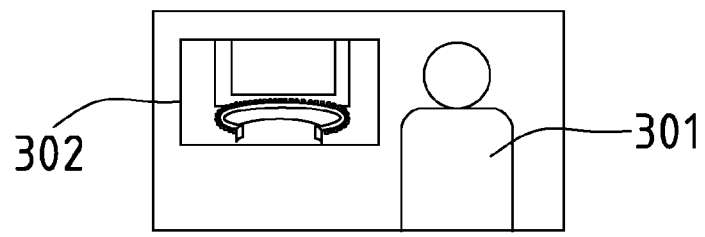
FIGS. 3A to 3C application examples of a vision mixer in a live TV production.
Figure 3B:
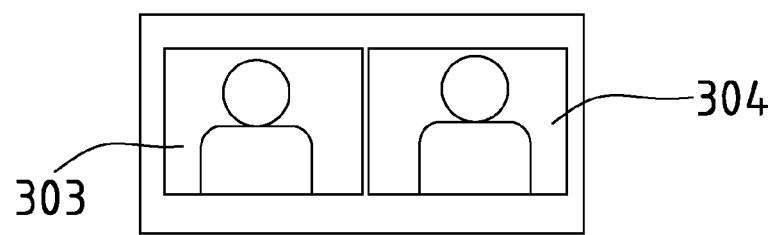
Figure 3C:
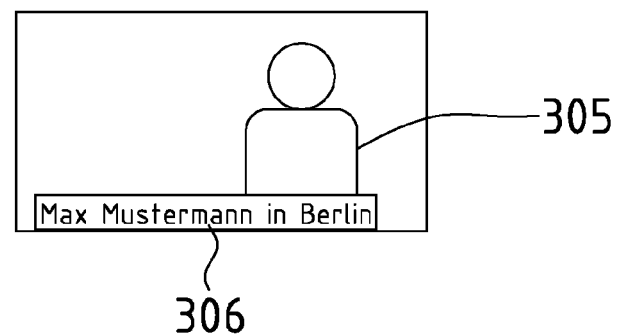

FIGS. 3A, 3B and 3C illustrate an application example of a vision mixer in a live TV production. In FIG. 3A a presenter 301 of a news broadcast is shown in front of an inserted image of a parliament 302 to which the news is related. The news presenter 301 is inserted as chroma key into the background. To enable the chroma key technology the news presenter is shot by a camera in front of a monochromatic background normally in blue or green color. The setting for this shot is known as Bluebox or Greenbox. In the chroma key stage the monochromatic background is removed and the presenter is cut out from this image and is superimposed over a different background. One M/E stage or mixing level generates the main image composition with a background image and foreground images. The foreground images are prepared by a video processing stage which is called "keyer" and are displayed in front of the background image.

In FIG. 3B a typical interview situation is shown in front of a graphical background. There are smaller images of the interviewer 303 and the interviewed person 304. The interviewer 303 and the interviewed person 304 are foreground images.

FIG. 3C shows a video clip with an interviewed person 305 as background and an inserted text with the name of the interviewed person as a keyer 306 in the foreground.

The vision mixer can generate increasingly complex image compositions the more keyers, trick generators and digital video effect channels the vision mixer comprises. The complexity determines the amount of hardware which is required for the vision mixer. The term "image" will be used in the following as a more general term for all the different kinds of video signals mentioned before.

The control of an entire video production is located in a control room. In the control room all video signals are displayed on a monitor wall. The director in the control room decides which signal or composition of images is broadcasted at any time.

Figure 4:
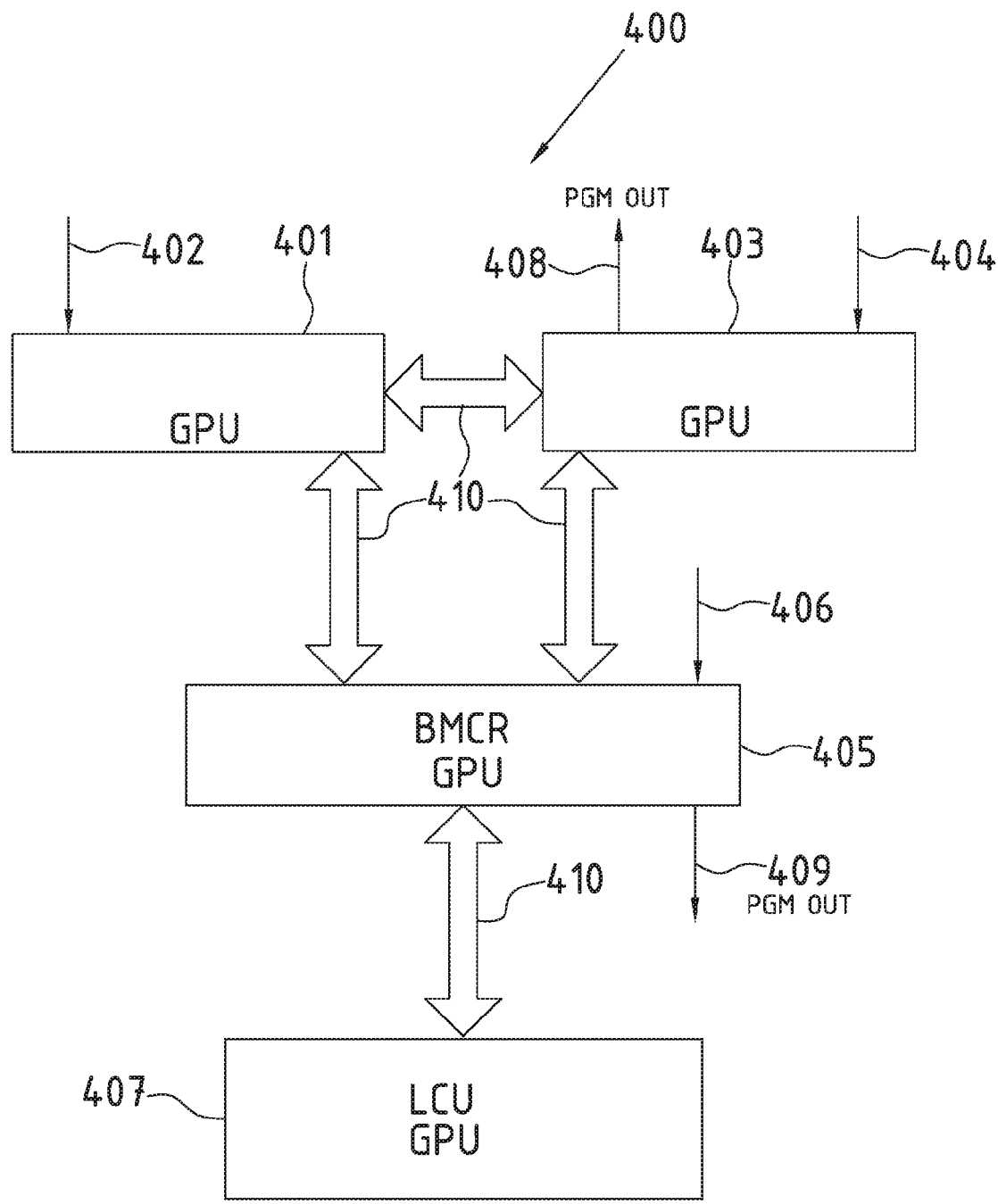
FIG. 4 a schematic block diagram of the system for video processing according to the present invention.

FIG. 4 shows a schematic block diagram of the architecture of the system for processing video and/or audio signals according to the present invention. The architecture of the inventive system allows building the hardware platform on standardized IT technology components such as servers, graphical processing units (GPU) and high-speed data links. Typically, these standardized IT components are less costly than dedicated broadcast equipment components. Besides the cost advantage the present invention benefits automatically from technological progress in the area of the above-mentioned IT components. In the inventive system video processing hardware is split into smaller and flexible video processing units and combines dedicated control, video and audio interconnections into one logical data link between the individual processing units. The data links are designed such that they have a reliable and constant time relation. The individual processing units work independently as fast as possible to achieve or even exceed real-time processing behavior. As mentioned before, real-time behavior corresponds to approximately 40 ms signal latency. The production system is built out of those individual production units which are connected with data links. The system ensures that overall production real-time behavior with simultaneous processing is achieved and generates a consistent production signal PGM-OUT. For this purpose the known individual delays for the transfer of control, video and audio signals between the different production units are considered. The data links are typically based on a reliable bidirectional high-speed data connection such as LAN or WAN. This general concept is described in greater detail in the following.

In the video processing system according to the present invention the video processing hardware is organized in processing units 401, 403, 405, and 407 according to the geographical distribution of a production i.e. according to the geographical distribution of the resources enabling the production as it is shown schematically in FIG. 4. The technical core of each processing unit is a server, one or several graphical processing units (GPUs) and high-speed data link connections operated by a processing application framework and dedicated algorithms. The processing application framework and the algorithms are realized in software. The algorithms are adaptable and extendable to also realize further functionalities going beyond the functionalities of conventional vision mixers. The video signals are processed by GPUs in commercially available graphic cards. Hence, according to the invention conventional video processing by dedicated hardware is replaced by software running on standardized IT components. All the processing capabilities of the GPUs are available and enable new video effects. However, this is not subject of the present invention.

The operator controls the whole production as if it would be at one single production site in a single production unit next to the control room. The entire production process is moved from dedicated video/audio and control routing to common data links. The individual wiring hardware such as SDI connections is replaced by standardized data networks. The routing of all signals in the data networks is bidirectional and the production output and monitoring signals like dedicated multi-view outputs can be routed to any production unit which is connected in the network without extra cabling expenses.

High-speed data networks are more and more available not only in video production sites such as film or TV studios but also in wide area distribution networks, e.g. multiple of 10 G Ethernet or Infiniband.

In studios, professional video networking means that the video content is transferred uncompressed. For HDTV formats 1080i/720p data rates of 1.5 Gbit/s are resulting in studio environment where uncompressed audio and video data are used. For HD format 1080p a net data rate of even 3.0 Gbit/s is resulting.

For example EP 1 936 908 A1 discloses a method, an apparatus and a data container for transferring high resolution audio/video data efficiently in an IP network. For this purpose high resolution video/audio data are efficiently embedded in RTP (real-time transport protocol) packets. For efficiently transporting the video and audio stream the Digital Moving-picture Exchange (DPX) format is utilized.

Referring back to FIG. 4 every block represents one of the distributed processing units belonging to the system which is referred to in its entirety with reference number 400. In the exemplary embodiment shown in FIG. 4 processing unit 401 is located in a football stadium in Frankfurt. Processing unit 401 receives as local sources 402 camera signals from the Stadium, slow-motion video from a local slow-motion server and eventually audio and video signals from an interview taking place locally. Processing unit 403 is also located in Frankfurt but not necessarily in the same place as processing unit 401. Processing unit 403 receives camera signals as local sources 404 from a live moderator and an interview room. Processing unit 405 is located in Berlin and represents the main processing room providing additional processing power for the ongoing production as well as access to archives and servers where for example advertisement clips are stored. The archives and the servers are indicated as local sources 406. The local sources 402, 404, and 406 provide the video and/or audio signals as SDI or streaming data. Finally, there is a processing unit 407 which represents the live control unit (LCU) located in Munich from where the live production is controlled and monitored.

The production result is leaving processing units 403 and 405 as video and audio output signals PGM-OUT 408 and 409 for being broadcasted. The processing units 401, 403, 405, and 407 are interconnected with each other with reliable bidirectional high-speed data links 410 as shown in FIG. 4. The data links 410 enable communication between the processing units 401, 403, 405, and 407 and provide constant and known signal delays between the production units which will be set out in more detail below. It is noted that the high-speed data links 410 represent logical data links which are independent of a specific hardware realization. For example, the data links 410 can be realized with a set of several cables. In the situation shown in FIG. 4 the data links 410 are an Internet protocol (IP) wide area network (WAN). In a WAN special measures have to be taken to make sure that the date packages are received in the same sequence as they have been sent over the network to meet the requirements of video processing. Appropriate measures can be taken on the protocol and/or hardware level of the network.

An example for a high speed data link over the internet is disclosed in EP 2 077 647 A1. The known method allows deriving the round trip time (RTT) of a data packet or the one-way delay (OWD). The round-trip time (RTT) or round-trip delay time (RTD) is the length of time it takes for a data packet to be sent plus the length of time it takes for an acknowledgment of that data packet to be received. This time delay therefore consists of the transmission times between the two points of a signal. The One-Way Delay value (OWD value) is calculated between two synchronized points A and B of an IP network and it is the time in seconds that a packet spends in traveling across the IP network from A to B. The transmitted packets need to be identified at source and destination in order to avoid packet loss or packet reordering.

The present invention uses e.g. a method for transmitting data over data links 410 according to EP 2 107 708 A1 and/or EP 1 936 908 A1. Both methods provide for stable and constant signal delays between the processing units. In the present invention the RTT and OWD values are used to adjust the individual signal delays in each of the processing units to make sure that the command signals are executed in a synchronized manner and that the system behaves like a single big vision mixer.

An alternative approach for an IP network used in the broadcast environment has been published in the article "Feasibility of Building an All-IP network—the BBC NGN Project" by Martin Nicholson, Steve Westlake and Yuan-Xing Zheng published in EBU technical review 2012 Q1 (ISSN: 1609-1469).

The known technologies make it possible to transfer all production signals such as video and audio signals as well as command signals in the same logical data link. The execution of a command signal occurs in a synchronized manner as it will be described in the following.

It is an advantage that the IP network infrastructure does not become obsolete when the next steps in broadcast technology arrive such as progressive HDTV, 3D-TV or ultrahigh definition TV. Only higher data rates need to be provided.

Figure 5:
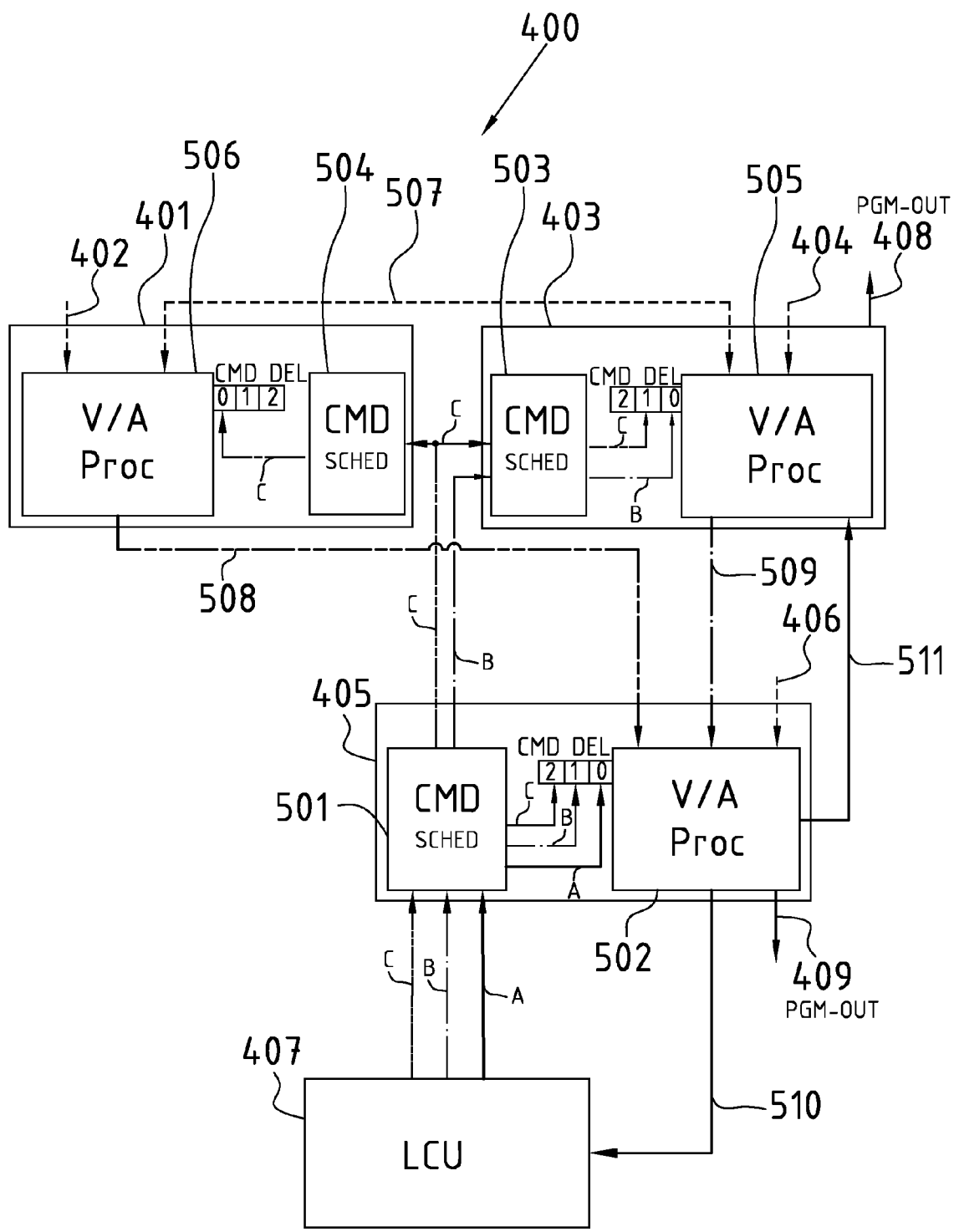
FIG. 5 the block diagram of FIG. 4 in greater detail.

FIG. 5 shows the video processing system 400 of FIG. 4 with a special emphasis on the synchronization details. The processing units 401, 403 and 405 are provided with video signals from local sources 402, 404 and 406 which are processed locally and/or just forwarded to further downstream located processing units. The local external sources 402, 404, and 406 are SDI inputs or video data streams. In general a downstream processing unit is a processing unit which is closer to the output of the processing system 400. In the context of the specific embodiment shown in FIG. 5 the processing units 403 and 405 are downstream with regard to processing unit 401 because the former provide the production output signal PGM-OUT 408 and 409.

The production system 400 is controlled by a user from the live control unit 407 which sends out command signals. Specifically, the live control unit (LCU) 407 sends a control command A to the Berlin Main control room 405 (BMCR, processing unit 405) which is received by a command scheduler 501. The command scheduler 501 detects that command signal A affects only the processing of the video signals in the Berlin Main control room 405. Therefore, the command scheduler 501 transfers the command signal A only to a delay stage CMD DEL of video and audio processor 502. The delay stage CMD DEL has three different inputs which are labeled with 0, 1, and 2. Each of the inputs is associated with a signal delay wherein the input labeled with 0 has essentially no delay, the input labeled with 1 has a medium delay, and the input labeled with 2 has the longest delay. Since no other processing unit needs to be synchronized with processing unit 405 for the execution of control command A it is provided to the input "0" of the delay stage CMD DEL. Consequently, command signal A is executed in real-time and therefore the program output (PGM-OUT) is also affected in real-time.

The live control 407 unit also sends a control command B to the Berlin Main control room 405. The command scheduler 501 detects that the command B has two recipients namely the Berlin Main control room 405 and the processing unit 403 in Frankfurt. Therefore, the command scheduler 501 forwards the command B or at least a part of the command B immediately to the processing unit 403 in Frankfurt. The transmission of command signal B from command scheduler 501 of processing unit 405 to command scheduler 503 of processing unit 403 takes some additional transmission time. Similarly, the transmission of a video signal between processing units 403 and 405 also takes some additional transmission time because all signals are transmitted via the same logical data link 410 (FIG. 4). In addition to that, the execution of a command requires 20 ms to 40 ms processing time. E.g. if the result of processing unit 403 is needed as an input for processing unit 405 then the processing time for executing command signal B has to be taken into account as well. In general, the processing time of command signals has to be considered for obtaining proper synchronization between the processing units. Without any further actions command signal B would be executed in processing unit 403 later than in processing unit 405. This would clearly lead to a disturbance of the production signal. Therefore, the command signal B is delayed in processing unit 405 by exactly the same amount of time which is required for the transmission and execution of command signal B from the command scheduler 501 to the command scheduler 503 of processing unit 403 plus the transmission time of the video signal between video/audio processors 505 and 502. Command signal B is therefore connected with input 1 of the delay stage CMD DEL of the video/audio processor 502 of processing unit 405 on the one hand. On the other hand, command signal B is connected with input 0 of the delay stage CMD DEL of the video and audio processor 505 of processing unit 403. As a result the command signal B is not executed at the same time in processing units 403 and 405 because the setting of the delay stage CMD DEL of video/audio processor 405 compensates for video and command signal latencies and for latencies introduced by processing times.

Finally, command signal C is directed to all three processing units 401, 403, and 405. The longest signal latency for the transmission of command signal C occurs between the command scheduler 501 and the command scheduler 504 in processing unit 401. A shorter signal latency occurs for the transmission of the command signal C from command scheduler 501 to command scheduler 503 in processing unit 403. Similarly, there are different latencies for the transmission of the video signals between the processing units 401, 403, and 405. The processing of command signal C requires 20 ms to 40 ms processing time in addition. In order to make sure that the execution of command signal C results in a consistent video output PGM-OUT the command signal C is not delayed in processing unit 401, it is delayed in processing unit 403, and it is delayed even more in processing unit 405. The different delays (no, medium, maximum delay) are illustrated in FIG. 5 by connecting the command signal C to input 0 of the delay stage CMD DEL of video/audio processor 506, to input 1 of the delay stage CMD DEL of video/audio processor 505 and to input 2 of the delay stage CMD DEL of video/audio processor 502.

The processing time required for executing a command in the video/audio processors 502, 505, and 506 does not depend on the complexity of the processing. The necessary processing time for each command is essentially constant.

It is noted that the command delays are not necessarily the same in the three different processing units 401, 403 and 405. The command delays are determined by measuring the video signal and command signal latencies between the three different processing units during configuration of the system before it is used in production. It is sufficient to provide for three different command delays in each processing unit to compensate for different signals delays when the signals are transferred between the three processing units. If the system involves more than three processing units in different locations then the number of different signal delays has to be increased correspondingly.

Between the processing units 401, 403, and 405 the video and audio signals are exchanged as production streams. Local sources can be exchanged between production unit 401 and 403 via production stream connection 507. Further production stream connections 508 and 509 are routed from processing unit 401 and 403 respectively to processing unit 405. A production monitoring stream 510 is routed from processing unit 405 to live control unit 407 for controlling the entire live production as well as the local sources 402, 404, and 406 by a production director. Similarly there is a feedback monitoring stream 511 directed to the processing unit 403. The feedback monitoring stream 511 is for example locally displayed on a multi-view monitor wall. All video and audio signal connections as well as the command signal connections shown in FIG. 5 are established by logical data links 410 (FIG. 4). One consequence of this is for example that the production output PGM-OUT or any monitoring stream can be routed to any processing unit. The system of the present invention is entirely flexible in this regard.

In the context of the present invention the terms "at the same time" and "simultaneously" are not to be understood in the mathematical sense. These terms have the meaning that the execution of commands in different processing units does not produce an inconsistent video or audio frame. The term "real-time" shall mean that the synchronization and the execution of a command takes place in less than approximately 40 ms.

As it has been mentioned above the signal delays introduced by the delay stages need to be adapted when the processing system is configured. After its configuration the distributed system behaves like a big system having the entire hardware located in a single site.

Figure 6:
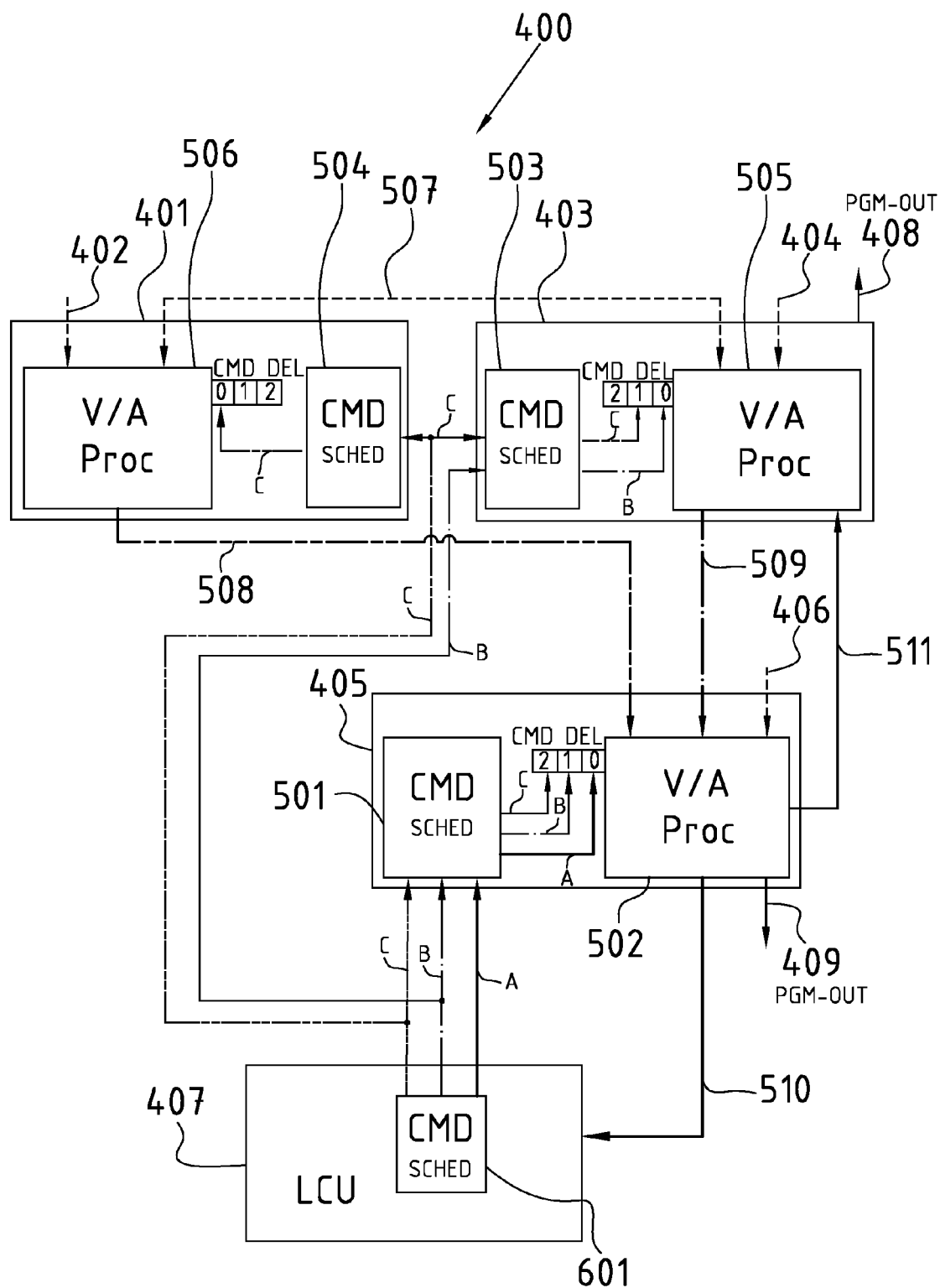
FIG. 6 the block diagram of FIG. 4 in greater detail according to an alternative embodiment.

FIG. 6 shows an alternative embodiment of the inventive video production system. The difference between the embodiments shown in FIGS. 5 and 6 is that in the embodiment of FIG. 6 the command signals A, B, and C are sent directly to the processing units 401, 403, and 405 from a command scheduler 601 in processing unit 407. The synchronization of the processing units 401, 403, and 405 is achieved in a similar way than it has already been described with reference to FIG. 5 and does not need to be repeated. In the embodiment shown in FIG. 6 the command scheduler 601 plays the same role with regard to the synchronization of the processing units 401, 403, and 405 as command scheduler 501 in the embodiment shown in FIG. 5.

In a further embodiment of the present invention the processing units 401 and 403 are not provided with the command scheduler 506 and 503, respectively, and execute command signals B and C immediately. In consequence, the video signals from processing units 401 and 403 are not available simultaneously at processing unit 405 and its video/audio processor 502. The processing units 401 and 403 communicate the video data contained in the video streams to processing unit 405 when they have completed the execution of command signals B and C. Only then processing unit 405 proceeds with the final processing. In other words in this embodiment each processing unit executes command signals as fast as possible but it begins with the processing only after it has received all necessary input signals including command signals, video and/or audio signals.

In another embodiment of the present invention several processing units are connected in the same location by a local area network (LAN) if the processing power of a single processing unit is not sufficient to realize a complex video production. Signal latencies between the processing units in the same location connected by a LAN are negligible. However, it is still necessary to compensate for latencies caused by the time needed for the processing of signals in order to synchronize the several processing units. The interconnected processing units produce the image compositions which are needed for the video production.

In yet another embodiment of the present invention the synchronization of the plurality of processing units is achieved by delaying the transmission of the video signals. In this embodiment the processing units are provided with sufficient memory to store the video signals.

Finally, it is noted that the processing unit according to the present invention is also provided with a conventional SDI video input/output interface such that the processing unit is compatible with existing broadcast infrastructure.

The system according to the present invention is scalable. The number of processing units interconnected with data links 410 can be adapted to the actually required processing needs for specific live video production. The scalability provides a lot of flexibility for the producers of live video productions. This flexibility enables providing sufficient processing power even for complex live video productions by connecting a sufficient number of processing units. At the same time simpler video productions do not block unnecessarily hardware as it is the case in conventional video production systems.

LIST OF REFERENCE NUMBERS 100 vision mixer
102 crosspoint matrix
103 input signals
104 output signals
105 mixing and a video effect stage
106 process video output signal
107 input unit
108 control bus
109 control unit
111 control box
112 control box
201 connection point
211 pushbutton
212a, 212b M/E stage
213a, 213b effect levers
214 selection buttons
216 parameter input array
217 downstream keyer
301 news presenter
302 inserted image
303 interviewer
304, 305 interviewed person
306 keyer
400 processing system
401 processing unit
402 external sources
403 processing unit
404 external sources
405 processing unit
406 local sources
407 processing unit
408, 409 output signals
410 data links
501, 503, 504 command scheduler
502, 505, 506 video and audio processing
507, 508, 509 production stream connection
510 production monitoring stream
511 feedback money touring stream
601 command scheduler

The invention claimed is:

1. System for processing video and/or audio signals, wherein the system comprises a control unit and two or more processing units, wherein the control unit and the processing units are communicatively connected by data links for exchanging digital data in a packetized format, wherein the data links are adapted to provide for latencies which are targeted to be constant, wherein the packetized data represent the video and/or audio signals, and command signals communicated between the control unit and the two or more processing units, wherein each processing unit comprises means for compensating signal latencies caused by signal communication between the control unit and one of the two or more processing units and/or between the two or more processing units characterized in that and each processing unit is associated with a command scheduler forwarding command signals to a delay stage of the associated processing unit, wherein the delay stage in the associated processing unit enables synchronized switching between the two or more processing units by compensating command signal latencies and latencies introduced by processing times.

2. System according to claim 1, wherein the one processing unit or the plurality of processing units comprise(s) one or several graphical processing units (GPU).

3. System according to claim 1, wherein the system is adapted for determining latencies of the video and/or audio signals, and the command signals transmitted through the data links.

4. System according to claim 1, wherein the means for compensating signal latencies comprise adaptable delays.

5. System according to claim 1, wherein the one processing unit executing a last processing step of the video and/or audio signals is adapted for executing this last processing step only after this one processing unit has received all necessary input signals from other processing units of the system.

6. System according to claim 1, wherein the control unit comprises a processing unit.

7. Method of processing video and/or audio signals utilizing a control unit and a plurality of processing units, which are communicatively connected by data links for exchanging digital data in a packetized format, wherein the data links are adapted to provide for latencies which are targeted to be constant, and wherein the method comprises:
   receiving the video and/or audio signals at the processing units;
   sending the video and/or audio signals from the processing units;
   sending command signals from the control unit to several processing units;
   scheduling the execution of the command signals received in the processing units by introducing one delay or several delays for the command signals in one or more delay stages of the several processing units to compensate for signal latencies caused by the signal communication between the control unit and the several processing units and to enable synchronized switching between the several processing units by compensating command signal latencies and latencies introduced by processing times.

* * * * *